United States Patent [19]

Sander

[11] Patent Number: 4,554,734
[45] Date of Patent: Nov. 26, 1985

[54] APPARATUS FOR AUTOMATIC INSERTION OF BALANCE WEIGHTS FOR USE IN AUTOMOBILE-WHEEL BALANCING EQUIPMENT

[75] Inventor: Rembrandt Sander, Darmstadt, Fed. Rep. of Germany

[73] Assignee: Gebr. Hofmann GmbH & Co. KG Maschinenfabrik, Pfungstadt, Fed. Rep. of Germany

[21] Appl. No.: 608,620

[22] Filed: May 9, 1984

[30] Foreign Application Priority Data

May 9, 1983 [DE] Fed. Rep. of Germany ....... 3316945

[51] Int. Cl.$^4$ .................. B23Q 7/10; B23Q 17/00; G01M 1/16; B60B 1/00
[52] U.S. Cl. ........................................ 29/818; 29/407; 73/468; 301/5 BA
[58] Field of Search ................ 73/458, 468, 470, 487; 29/818, 407; 301/585 BA

[56] References Cited

U.S. PATENT DOCUMENTS

| | | | |
|---|---|---|---|
| 3,623,208 | 11/1971 | Hofmann | 29/407 |
| 3,748,910 | 7/1973 | Hofmann | 73/468 |
| 3,808,660 | 5/1974 | Wik | 29/407 |
| 4,379,596 | 4/1983 | Green et al. | 301/5 B |

FOREIGN PATENT DOCUMENTS

| | | |
|---|---|---|
| 1302214 | 12/1970 | Fed. Rep. of Germany . |
| 1698628 | 8/1977 | Fed. Rep. of Germany . |
| 0914753 | 1/1963 | United Kingdom . |
| 1066818 | 4/1967 | United Kingdom ........... 301/5 BA |
| 1259481 | 1/1972 | United Kingdom . |

OTHER PUBLICATIONS

"Vollautomatisierter Massenausgleich bei Fahrzeugrädern", Dionys Hofmann, *Automobil-Industri*, Nr. 25F/1963.

Primary Examiner—Howard N. Goldberg
Assistant Examiner—Steven Nichols
Attorney, Agent, or Firm—Fleit, Jacobson, Cohn & Price

[57] ABSTRACT

Delivery apparatus for carrying a plurality of balance weights for automobile wheels and delivering a suitable weight to an insertion device to fit the weight on the rim of a wheel in a predetermined circumferential position. The balance weights have parallel through bores and the insertion device includes a pair of spaced mandrels receivable in the through bores of the weights to carry the weights from a storage compartment to an automobile wheel and install the weight on the rim at the predetermined position. The apparatus includes a clip applying apparatus to force a retaining clip over the balance weight and the wheel rim to secure the weight to the rim.

6 Claims, 4 Drawing Figures

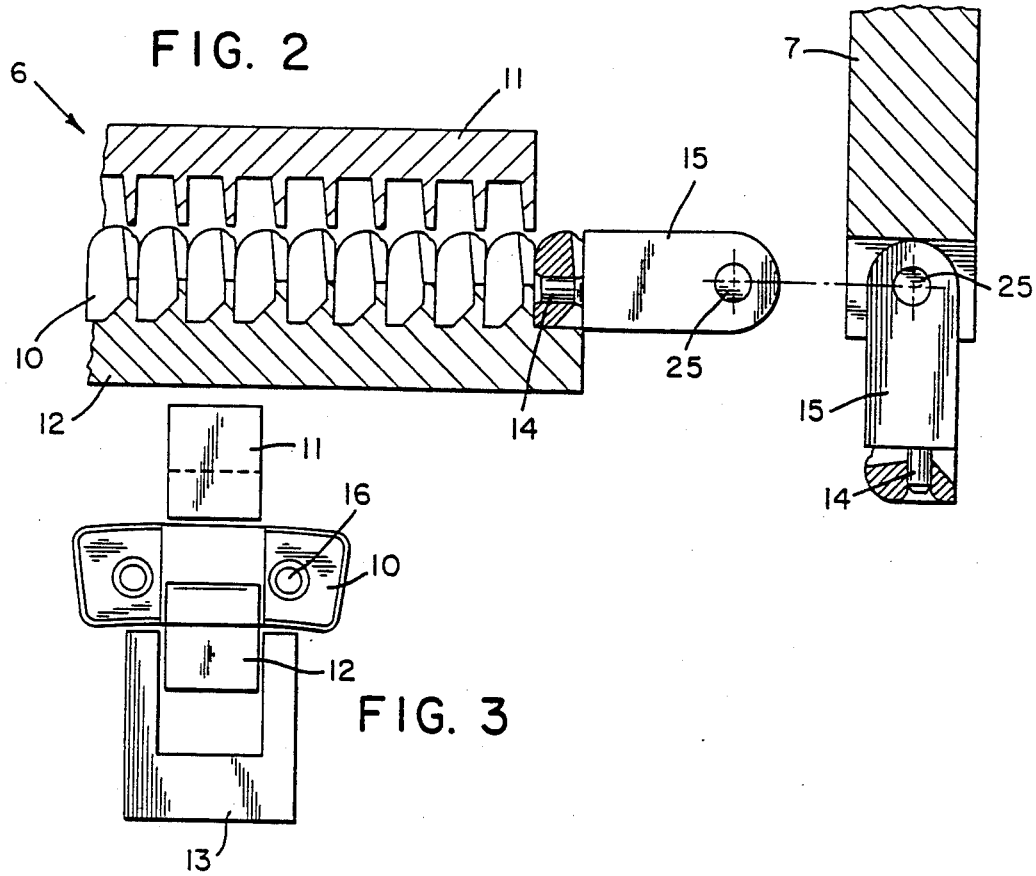
FIG. 2
FIG. 3
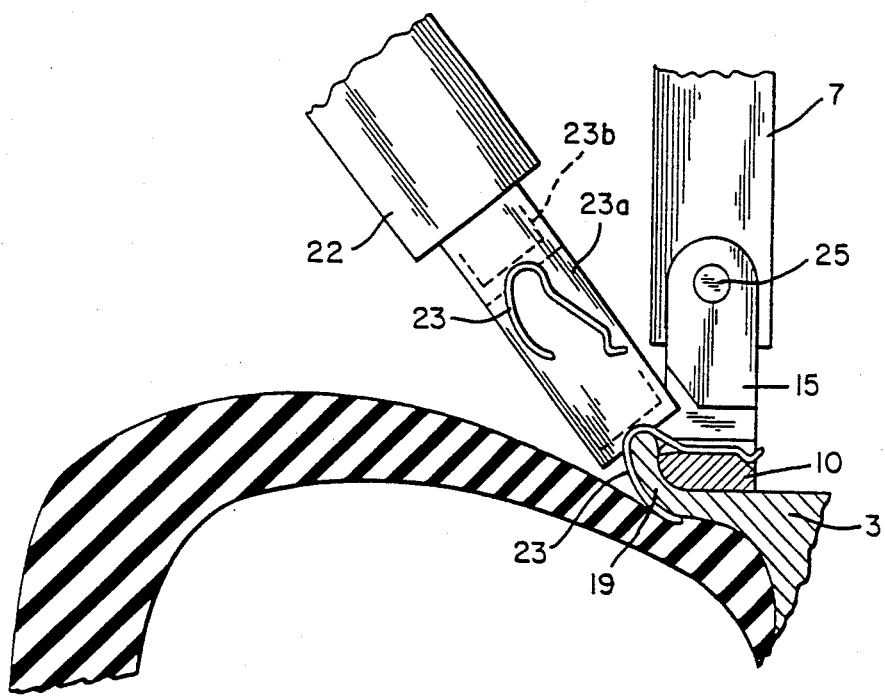
FIG. 4

APPARATUS FOR AUTOMATIC INSERTION OF BALANCE WEIGHTS FOR USE IN AUTOMOBILE-WHEEL BALANCING EQUIPMENT

BACKGROUND OF THE INVENTION

This invention relates to wheel balancing, and more particularly to an apparatus for automatic insertion of balance weights for balancing automobile wheels.

DESCRIPTION OF THE PRIOR ART

German patent application DE-AS 1,302,214 refers to a balance weight for fully automatic balancing machines, which weight is provided with two through bores. Several weights of one size are then piled up by means of bars inserted into the through bores. That application lacks any indication of how the individual weights can be applied automatically to the automobile wheels to be balanced.

Another German patent application DE-PS 1,698,628 relates to an apparatus for automatic insertion of balance weight clips open on one side only, which apparatus is provided on balancing equipment for automobile wheels. Preferably, in the lower correction plane a support simulating the balance weight is caused to slide into the opening of the clip, and is removed therefrom as soon as the bead breaking tool has withdrawn from the tire and the tire has been released. This patent application, also, lacks any indication of how the balance weights are transported from compartments to the automobile wheel and how they can be automatically applied to the wheels to be balanced.

Apparatus for insertion of balance weights in automobile wheel balancing equipment is disclosed in the article, "Fully Automated Mass Correction On Automobile Wheels", which was published in *Automobile-Industrie* magazine, No. 25F/1963. With this known apparatus, stacked balance weights are filled by hand from above into vertically arranged boxes that are classified by size of weight. When filled into these boxes, the balance weights might easily get into an inclined position, owing to their outer shape, and thus cause a jam inside the box so that the weights are not always available for application to a wheel in a predetermined position.

Further, in the known apparatus for insertion of balance weights, the weights drop under the effect of gravity onto a chain and are transported to a delivery system. This system takes them by their outside and applies them to the rim flange of the wheel to be balanced after the latter has been indexed into the correction position previously determined.

Troubles are likely to occur in the known apparatus owing to delivery of the balance weights in non-specified position from the boxes onto the chain and then to the delivery system. Another disadvantage consists in that the system transports the weights by their outside, and as inaccuracies in the manufacture of the cast balance weights cannot always be avoided, this results in difficulties with the delivery system accepting the balance weights. Finally, another disadvantage is that supplying the balance weights on the interposed chain takes a long time.

SUMMARY OF THE INVENTION

Therefore, it is an object of the present invention to provide an apparatus for insertion of balance weights while a wheel is on the automobile wheel balancing equipment, which guarantees precise and safe positioning of the balance weights and quick supply to the correction position and is furthermore less susceptible to operating problems.

The characteristics of the apparatus of the present invention are set forth in claim 1 and expedient improvements of the invention are given in the subclaims.

The apparatus includes separate gear rack compartments, the lower parts of which are preferably shaped to fit the profiles of the balance weights, and where the balance weights are loaded, and ensures safe and precise supply of the balance weights to a delivery system in which mandrels are provided to take the balance weights from the compartments, the whole system being adjustable so as to compensate for any inaccuracies on the automobile wheel to be balanced. Furthermore, quick operation of the whole apparatus is guaranteed as the delivery system includes a weight mounting tool as well, without any further transport means interposed.

In a preferred embodiment of the invention the separate parts of the gear rack compartment are cycled in opposite directions so that the balance weights are fed in the cycle of the machine towards the delivery system.

Furthermore, the mandrels of the delivery system take the balance weights preferably by their bores to build up a closing shape and/or frictional connection with the weight.

BRIEF DESCRIPTION OF THE DRAWINGS

The preferred embodiment is illustrated in the accompanying drawings, in which:

FIG. 2 is a side view (partially in section) of a gear rack-type compartment in accordance with the present invention.

FIG. 3 is a front view of the gear rack-like compartment illustrated in FIG. 2.

FIG. 4 is a fragmentary view showing the insertion of a balance weight on an automobile wheel by means of apparatus in accordance with the present invention.

DESCRIPTION OF THE PREFERRED EMBODIMENT

Figure 1:
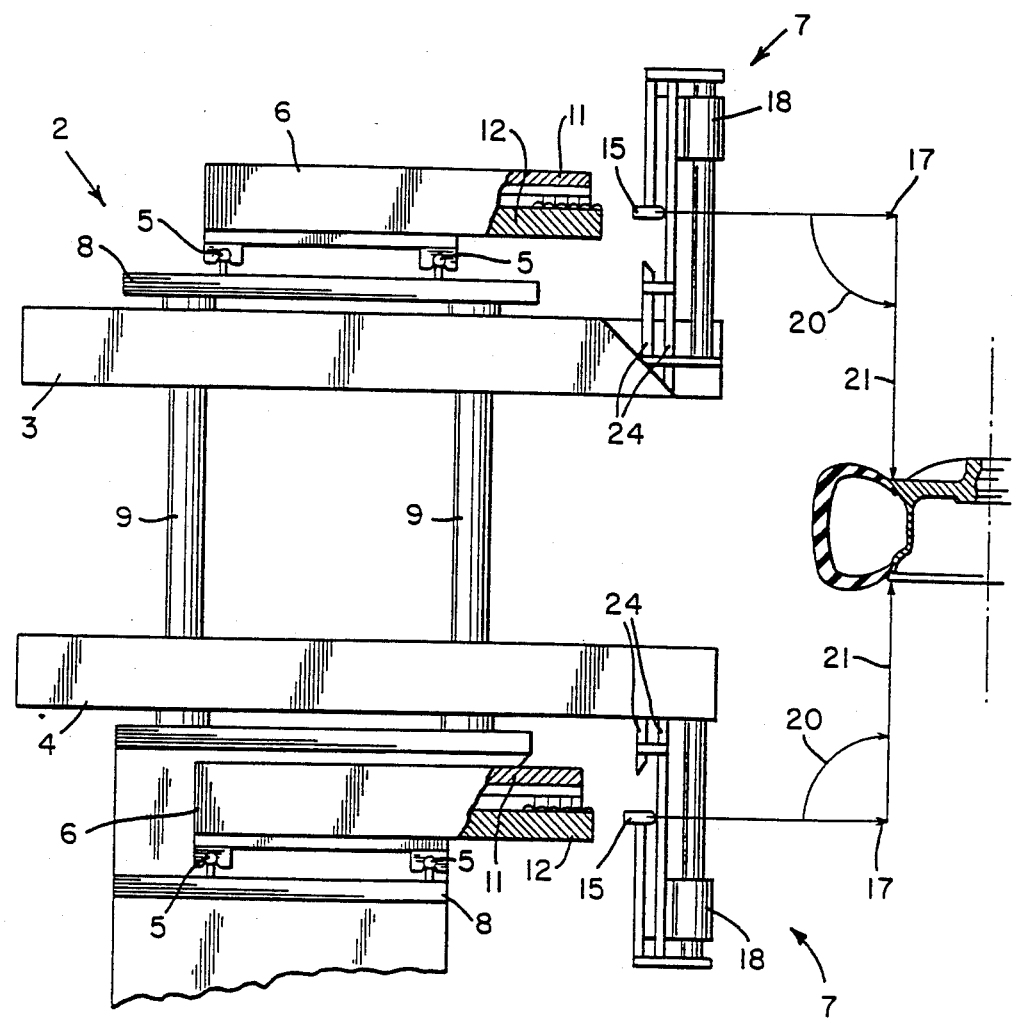
FIG. 1 is a schematic diagram of the apparatus in accordance with the present invention for insertion of balance weights in two planes of automobile wheels.

Referring now to the drawings, and particularly to FIG. 1 thereof, there is shown an automobile wheel 1 secured on a known balancing machine by known clamping means, neither of which is shown. The amount and location of unbalance of the automobile wheel have been determined using a known balancing machine. For this purpose the wheel is rotated to a given speed, and because unbalance will result in wheel vibrations when the wheel is rotated, the vibrations produced by the unbalance are measured by means of suitable force or displacement transducers, and the signals produced thereby are supplied to an electronic measuring unit for analysis. At the same time the measured data are entered into a positioning device (not shown) which indexes the automobile wheel 1 such that the location of unbalance of either of the two correction planes is determined.

In accordance with the present invention, when the location of unbalance is determined, the wheel is indexed so that the location of unbalance is positioned adjacent the point of insertion of a balance weight insertion device 2. Mass correction is performed in either the top plane 1a or the bottom plane 1b of the rim of wheel 1, depending on which unbalance location has been indexed to be adjacent the insertion device 2. The insertion device 2 includes an upper insertion device 3 and a lower insertion device 4 for the upper and the lower correction planes of the automobile wheel 1, respectively. The following discussion refers only to the upper insertion device 3, but it should be understood that it also applies to the lower insertion device 4.

For accommodation of weights of different sizes, several compartments 6 are mounted on a pair of spaced, parallel guides 5 for movement along guides 5 to a delivery device 7 by means of a feeding unit, the size of the weight presented to the delivery device 7 depending upon the amount of the unbalance that has been measured. Compartments 6 and the guides 5 are supported on carriers 8 which can be secured to a suitable balancing machine, the structural details of which are known to those skilled in the art.

A second pair of parallel guides 9 is provided and extends between two carriers 8 to movably support the insertion devices 3 and 4 in an overhung position and to allow their vertical adjustment relative to wheel 1 as shown so that they can function as an insertion tool.

As illustrated in FIGS. 2 and 3, gear rack-like compartments 6 having spaced teeth to define weight-receiving openings are used to store a plurality of balance weights 10. Said gear rack compartments 6 preferably include stationary upper parts 11 and movable lower parts 12. However, the design may also be such that the lower part 12 is stationary and the upper part 11 is movable. As shown in FIG. 2, the profile of the lower part 12 is so shaped to accommodate the profile of the balance weights 10 so that the latter will occupy a safe and precise position. The upper part 11 is shaped to accommodate the profile of the balance weights as well.

The balance weights 10, which are preferably in stacks and supported by means of bars, are loaded by hand into the compartments 6. The compartments are so designed that there is always a sufficient quantity of balance weights available for the balancing machine, with the quantity being based on prior statistical calculations of usage rates.

The lower part 12 of the compartment 6 is moved forward by one tooth during the operating cycle of the machine by suitable pushing means, such as a rectangular conveyor (not shown) or the like. At first the balance weights 10 are raised by means of a U-shaped lifting device 13, which partially surrounds lower part 12 of the gear rack compartment 6, and which lifts the weights into the upper part 11 of the compartment so that the lower part 12 can be moved rearwardly away from the wheel, and then to return to its initial position. Then the lifting device 13, which extends over the full length of the gear rack compartment 6, is lowered. As a result, the balance weights 10 are positioned safely and precisely in the lower part 12, as already mentioned above. The lower part 12 of the compartment 6 having advanced, the delivery system 7 will advance as well, toward compartment 6, so that the mandrels 14 that extend from the insertion head 15 can engage with the bores 16 of a balance weight 10. The mandrels 14 and the balance weight 10 may be so shaped that mandrels 14 enclose weight 10 or frictionally engage with it. In particular, the two mandrels 14 can be moved outwards, away from each other, thus acting like expanding levers to securely engage and retain weights 10.

After mandrels 14 engage balance weight 10, the delivery system 7 then moves in the direction of arrow 17 (see FIG. 1) to the radius of the upper correction plane of the automobile wheel 1. While being lowered by the feeding unit 18, the insertion head 15 is pivoted by 90 degrees in the direction of arrow 20 by means of a suitable pivoting means, e.g., a crank (not shown), so that the insertion head 15 with the balance weight 10 points vertically downward in the direction of the rim of the automobile wheel 1. The feeding unit continues to lower the insertion head 15 in the direction of the arrow 21 until the balance weight 10 is applied to the rim flange 19 of the automobile wheel 1, as shown in FIG. 4. Owing to the interconnection through pivot 25 of the insertion head 15 and the delivery system 7, inaccuracies in the rim 3 of the wheel 1 can be compensated for automatically and without difficulty as the insertion head is pressed precisely against the rim flange 19 by known pressing means (not shown) which exert a downward pressure on the insertion head 15.

After the positioning of the balance weight 10, another feeding unit 22 slides a clip 23, using a suitable clip carrier 23a, in a known manner over the balance weight 10 and rim flange 19 so as to secure the weight in the desired position on the rim. The clip 23 is preferably held by magnetic forces on the feeding unit 22. Before the clip is mounted, the tire bead may be removed from the rim 3 by means of a known bead breaking unit (not shown). The clip 23 is then pushed over the balance weight and wheel rim by means of a pusher 23b.

When the insertion head 15 is pressed against the rim together with the balance weight 10 and when the clip 23 is caused to slide over the weight, the forces exerted are counteracted by the other insertion device 4, which is applied to rim 3 of the wheel 1 from the other side, but without mounting a balance weight, to offset the downward force exerted by insertion device 3.

After the automobile wheel to be balanced 1 has been indexed to the second correction position, correction is carried out analogously for the second balancing plane. Similarly, insertion device 3 applies a counteracting force, and without mounting a balance weight, when insertion device 4 is operated to apply a weight to the lower plane of rim 3. After a balance weight is withdrawn from lower part 12, the remaining weights are raised by lifting device 13 to carry the weights into upper part 11. Lower part 12 then moves rearwardly by the spacing between adjacent balance weights so that the first balance weight in upper part 11 is above the first weight-receiving opening in lower part 12. The weights are then lowered into lower part 12, which is then moved forward again to its initial position with the next balance weight in the first weight-receiving opening for presentation to the delivery system and subsequent application to a wheel at the proper position for balancing the wheel.

Although a particular embodiment of the present invention has been illustrated and described, it will be apparent that various changes and modification can be made without departing from the spirit and scope of the invention, and it is desired to encompass within the appended claims all such changes and modifications that fall within the scope of the present invention.

What is claimed is:

1. An apparatus for automatic insertion of balance weights onto an automobile wheel, said apparatus comprising: balance weight carrier means for receiving and carrying balance weights having through bores, delivery means for taking individual balance weights from the carrying means and applying the weights to the rim flange of the automobile wheels, said carrier means including upper and lower parts having compartments for receiving the balance weights and movable toward the delivery means by a relative movement of the lower part with respect to the upper part, said delivery means including mandrels receivable in the through bores of the balance weights for taking the balance weights out of the carrier means, and an insertion head carried by the delivery means, said insertion head being pivotable to accommodate minor inaccuracies of the automobile wheels when the balance weights are applied to the rim flange of the automobile wheels.

2. An apparatus as set forth in claim 1, in which at least the lower part of the carrying means is in the form of a plurality of spaced compartments shaped to fit the profile of the balance weights.

3. An apparatus as set forth in claim 1, in which said delivery means engages with the bores of the balance weights and includes means for moving said mandrels sideways relative to each other to securely grip the balance weight.

4. An apparatus as set forth in claim 1, including balance weight lifting means positioned along said carrier means to lift the balance weights from the lower part to the upper part during a balance weight insertion cycle.

5. An apparatus as set forth in claim 1, including feeding means for feeding a retaining clip over the balance weight and the wheel rim after the weight has been placed on the rim in the predetermined position.

6. An apparatus as set forth in claim 5, wherein said feeding means includes magnetic means for holding retaining clips in said feeding means.

* * * * *